US012509382B2

(12) United States Patent
Samad

(10) Patent No.: US 12,509,382 B2
(45) Date of Patent: Dec. 30, 2025

(54) CONTROLLING BIOFOULING IN WATER PURIFICATION

(71) Applicant: Saudi Arabian Oil Company, Dhahran (SA)

(72) Inventor: Nidal A. Samad, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 513 days.

(21) Appl. No.: 17/411,224

(22) Filed: Aug. 25, 2021

(65) Prior Publication Data
US 2023/0064074 A1    Mar. 2, 2023

(51) Int. Cl.
*C02F 9/00* (2023.01)
*B01D 65/08* (2006.01)
(Continued)

(52) U.S. Cl.
CPC ............... *C02F 9/00* (2013.01); *B01D 65/08* (2013.01); *C02F 1/004* (2013.01); *C02F 1/008* (2013.01); *C02F 1/44* (2013.01); *C02F 1/78* (2013.01); *B01D 2311/04* (2013.01); *B01D 2311/2634* (2013.01); *B01D 2321/185* (2013.01);
(Continued)

(58) Field of Classification Search
CPC ............... B01D 65/08; B01D 2311/04; B01D 2311/2634; B01D 2311/2642; B01D 2311/2661; B01D 2321/185; C02F 1/004; C02F 1/008; C02F 1/38; C02F 1/44; C02F 1/78; C02F 9/00; C02F 2201/782; C02F 2209/008; C02F 2209/04; C02F 2209/23; C02F 2301/046; C02F 2303/04; C02F 2303/16; C02F 2303/20
See application file for complete search history.

(56) References Cited

U.S. PATENT DOCUMENTS

2003/0094422 A1*  5/2003  Perkins ................... A61L 2/183
                                                    210/764
2005/0051488 A1*  3/2005  Nagghappan .......... B01D 61/04
                                                    210/764
(Continued)

FOREIGN PATENT DOCUMENTS

CN    112573764 A    3/2021
EP    1935479 A3    9/2008
(Continued)

OTHER PUBLICATIONS

Sartor, et al., "Demonstration of a new hybrid process for the decentralised drinking and service water production from surface water in Thailand," Desalination, 222:528-540 (Year: 2008).*

(Continued)

Primary Examiner — Patrick Orme
(74) Attorney, Agent, or Firm — Fish & Richardson P.C.

(57) ABSTRACT

A system and a method for water purification are provided. An exemplary system includes a multimedia filter, an ozone generator, an ozone contactor coupled to the ozone generator, and a ceramic membrane filter coupled to an air scouring system, wherein the air scouring system is coupled to the ozone generator. A storage tank is coupled to a purified water line from the ceramic membrane filter, wherein the storage tank is coupled to a backwashing line coupled to the multimedia filter.

12 Claims, 2 Drawing Sheets

(51) Int. Cl.
  *C02F 1/00* (2023.01)
  *C02F 1/44* (2023.01)
  *C02F 1/78* (2023.01)
(52) U.S. Cl.
  CPC .... *C02F 2201/782* (2013.01); *C02F 2209/04* (2013.01); *C02F 2303/04* (2013.01); *C02F 2303/20* (2013.01)

(56) References Cited

U.S. PATENT DOCUMENTS

2014/0021137 A1* 1/2014 Smiddy .................. C02F 1/281
 210/663
2021/0170340 A1 6/2021 Koga et al.

FOREIGN PATENT DOCUMENTS

| KR | 20190032819 A | 3/2019 | | |
|---|---|---|---|---|
| WO | WO 2010133774 | 11/2010 | | |
| WO | WO-2010133774 A1 * | 11/2010 | ............. | B01D 61/18 |

OTHER PUBLICATIONS

WO2010133774A1—EPO Machine Translation (Year: 2023).*
Spartan, "Ozone Water Treatment for Taste and Odor Control" (Year: 2024).*
Mettler-Toledo, "Process Analytics Catalog" (Year: 2018).*
PCT International Search Report and Written Opinion in International Appln. No. PCT/US2022/075373, dated Oct. 28, 2022, 15 pages.
Pureaqua.com [online], "Water Multimedia Filter How to Choose a Multimedia Filter? How does a Multimedia Filter Work?," available on or before Nov. 2019, retrieved from URL <https://pureaqua.com/water-multimedia-filter/> on Oct. 18, 2022, 8 pages.
Sartor et al., "Demonstration of a new hybrid process for the decentralised drinking and service water production from surface water in Thailand," Desalination, 222:528-540, Apr. 2007, 13 pages.

* cited by examiner

CONTROLLING BIOFOULING IN WATER PURIFICATION

TECHNICAL FIELD

The present disclosure is directed to controlling biofouling during the purification of water.

BACKGROUND

Mitigating the biofouling of membranes used in water treatment systems has been the subject of many research studies. Biofouling, which is the formation of biofilms on the surfaces in the water treatment systems, can increase the operating costs of the water treatment systems and reduce the output. As a result, the water treatment systems may fail to meet water demand. Research efforts for controlling biofouling have focused on new biofouling resistant membrane materials, surface modification of the membranes, design modification of the RO system, and new disinfectants formulations, among others.

Fouling is not only due to the biological organisms that form the biofilms on the membranes, but is also promoted by the presence of food that supports the growth of microorganisms, termed assimilable organic carbon (AOC). Chlorine is an effective disinfectant, eliminating microorganisms by rupturing the cells. However, the rupturing of the cells increases the AOC by releasing the cell constituents into the water. Further, chlorine requires a relative high contact time compared to other disinfectants. As used herein, contact time is the time during which a disinfectant is in contact with the target material, such as in a mixture with water to be disinfected or in contact with a surface.

Generally, the specific contact time for different disinfectants has been studied and determined, but often given little to no attention during the design of the complete system. In some instances, an excess of disinfectant is added without providing the proper contact time to reach the proper log-reduction in cell counts. Further, many membranes cannot tolerate exposure to relatively higher level of disinfectant without degradation or negatively impacting the integrity of the membranes. Accordingly, the disinfectant has to be removed from a water flow prior to contacting the water flow with the membranes. This results in partial disinfection, since the disinfectant is removed, leaving behind active biological organisms with adequate AOC to support their growth. Thus, more effective disinfection and control systems are needed.

SUMMARY

An embodiment described in examples herein provides a system for purifying water. The system includes a multimedia filter, an ozone generator, an ozone contactor coupled to the ozone generator, and a ceramic membrane filter coupled to an air scouring system, wherein the air scouring system is coupled to the ozone generator. A storage tank is coupled to a purified water line from the ceramic membrane filter, wherein the storage tank is coupled to a backwashing line coupled to the multimedia filter.

Another embodiment described in examples herein provides a method for controlling biological fouling during purification of water. The method includes adding ozonated water to a feed water stream, filtering the feed water stream through a multimedia filter (MMF) forming a filtered water stream, and passing the filtered water stream through an ozone contactor forming a disinfected water stream. The method includes passing the disinfected water stream through a ceramic membrane filter forming a purified water stream, and providing an air scouring stream comprising ozone to the ceramic membrane filter.

DETAILED DESCRIPTION

As discussed herein, better controlled disinfection systems will reduce the impact of biofouling, extend the life of the membranes, reduce the frequency of backwashing and cleaning in place. Systems that use reverse osmosis (RO) membranes generally have fouling problems even with adequate pretreatment of the feed water. This can lead to a need for frequent RO membrane backwash and clean-in-place. Further, it may lead to more frequent replacement of the membranes.

A water purification system and method is provided herein. The water purification system includes a pretreatment system that includes a multimedia filter (MMF). A biofouling control system based on an ozone stream is used to control biofouling in the MMF. The water purification system also includes an ozone generator, an ozone contactor, a control system, a ceramic membrane filtration system, and an MMF backwash stream recycling method for water conservation.

The control system provides a disinfectant dose at multiple locations to destroy microorganisms in the feed water, to lower the disinfectant demand caused by natural AOC, to oxidize any AOC released from the cells of the microorganisms and to control biofouling of the system. Further, the amount of disinfectant is carefully controlled, leading to lower exposure of the membranes to the disinfectant, which will decrease the amount of degradation of the membranes caused by the disinfectant.

The method includes introducing the disinfectant (ozone) at three locations within the pretreatment system. Two sensors are used to measure dissolved ozone at different points in the system. The produced water is stored at the end of the process, and is also used to provide a backwash stream for the MMF.

Figure 1:
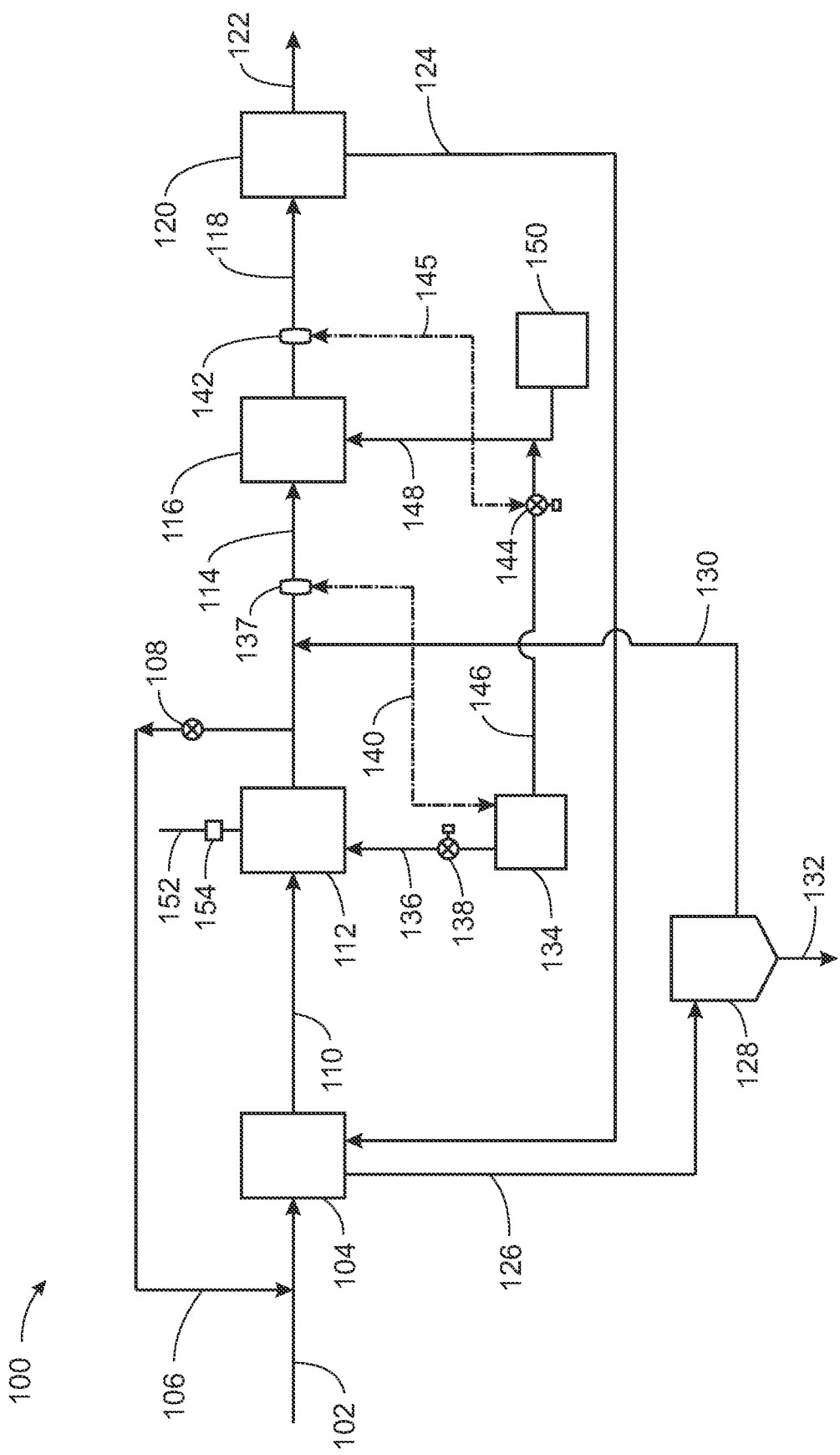
FIG. 1 is a schematic diagram of a water purification system that controls biofouling.

FIG. 1 is a schematic diagram of a water purification system 100 that controls biofouling. Referring to FIG. 1, the feed water stream 102 (in a feed water line) is filtered through the multi-media filter (MMF) 104 which is protected from biological fouling by introducing ozonated water into the feed water stream 102 through the ozonated side stream 106 (from an ozonated side stream line). As used herein, the materials transferred between vessels are referred to as streams. It can be understood that each of these streams is carried in a line. For example, the feed water stream 102 is carried in a feed water line.

The ozonated side stream 106 is controlled by a valve 108. The filtered water stream 110 (in a filtered water line) is transferred to an ozone contactor 112 for further ozone treatment where ozone demand, for example, due to the elimination of biological organisms and the oxidation of assimilated organic carbon (AOC) is achieved. Generally, a residual dissolved ozone concentration between about 0.15 and about 0.20 mg/liter $O_3$ (ppm) is desired.

From the ozone contactor 112, the disinfected water stream 114 (in a disinfected water line) passes through a ceramic membrane filter 116 which is equipped with an air-ozone scouring system to further control biological fouling and to keep solids from building up on the ceramic membrane surface, help to increase the run time before cleaning.

The purified water stream 118 (in a purified water line) from the ceramic membrane filter 116 is stored in a tank 120 to serve as supply 122 (in a supply line) to downstream water equipment/systems. The tank 120 also provides a backwashing stream 124 (in a backwashing line) to the MMF 104.

The backwash waste stream 126 is stored in a conical tank (the MMF backwash tank) 128, allowing the separated solids to partially settle to the bottom of the MMF backwash tank 128, and slowly reusing the clarified supernatant water 130 (in a clarified supernatant water line), rather than discharging through a drain line 132 into a sewer system. This is performed by mixing the clarified supernatant water 130 with the disinfected water stream 114 feeding the ceramic membrane filter 116.

An ozone generator 134 is used to generate ozone gas 136 for the disinfection in the ozone contactor 112. In some embodiments, the flow of the ozone gas 136 to the ozone contactor 112 is controlled through a valve 138. In other embodiments, the valve 138 is opened, and the amount of ozone gas 136 fed to the ozone contactor 112 is controlled by the amount generated in the ozone generator 134.

A dissolved ozone sensor 137 installed in-line controls the dissolved ozone concentration at about 0.15 ppm to about 0.25 ppm, or about 0.2 ppm. Mixing the clarified supernatant water 130 with the disinfected water stream 114 will cause the dissolved ozone concentration to drop. The dissolved ozone sensor 137 will control the ozone generator 134, for example, through a control line 140, maintaining or increasing production until the desired dissolved ozone concentration is reached.

The purified water stream 118 (in a purified water line) of the ceramic membrane filter 116 is also equipped with a dissolved ozone sensor 142 that controls a valve 144 on an outlet of the ozone generator 134 through a control line 145 to control the amount of ozone gas 146 (in an ozone gas line) fed to an air scouring system that includes an air scouring stream 148 (in an air line) from an air source 150. If the oxidation reduction potential (ORP) drops to or below 400 mVolt, the valve 144 is proportionally opened to allow more of the ozone gas 146 to mix with the air scouring stream 148 from the air source 150 injected into the ceramic membrane filter 116.

The pressure in the ozone contactor 112 can be maintained by a vent 152. A pressure regulator 154 can be used to control the pressure in the ozone contactor 112. Depending where the vent 152 is located, an ozone destruct unit (not shown) might be necessary.

Figure 2:
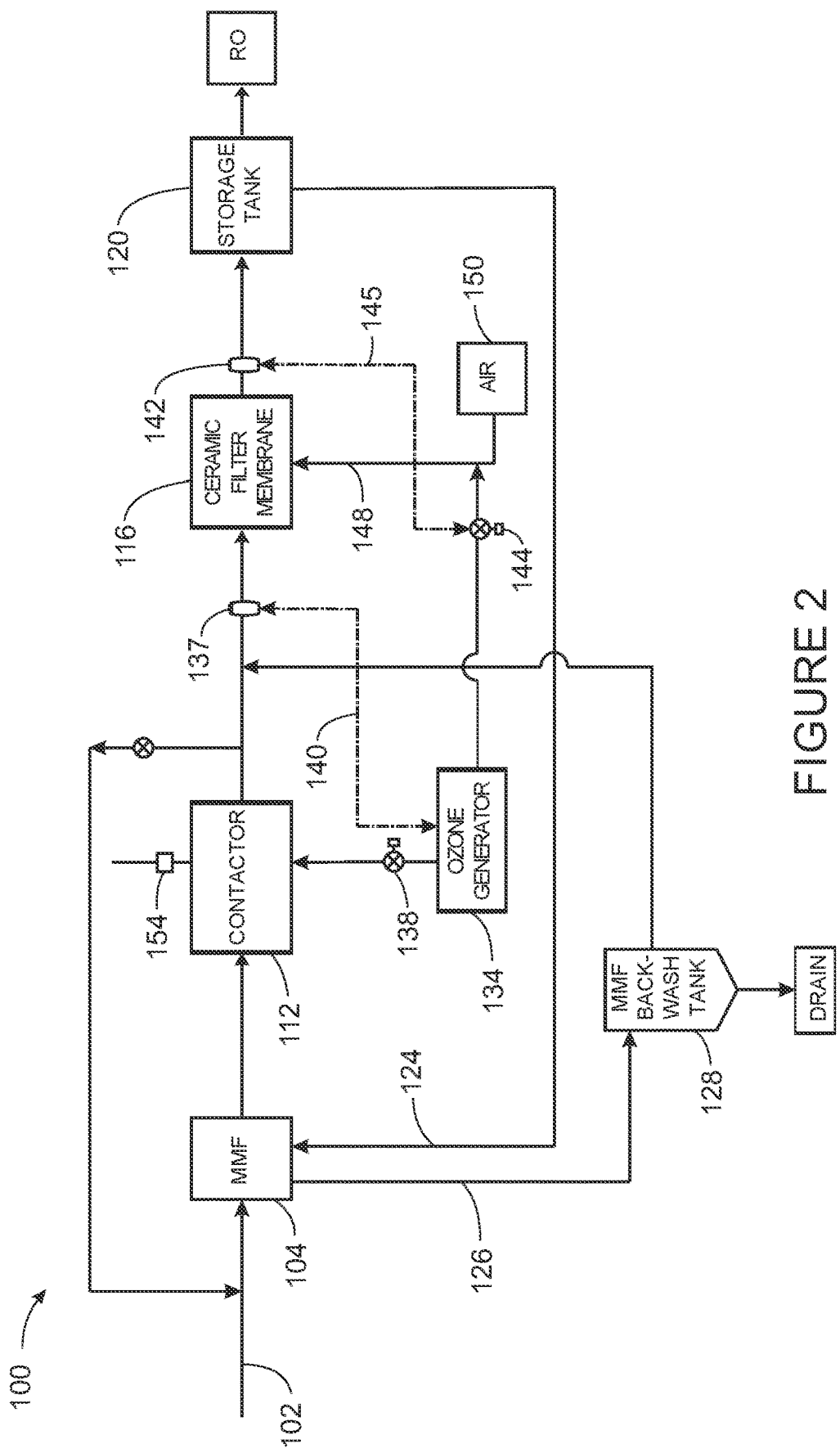
FIG. 2 is a block diagram of the water purification system.

FIG. 2 is a block diagram of the water purification system 100. Like numbered items are as described with respect to FIG. 1. As used herein, the MMF 104 is a filter unit that includes filter media in a vessel. In some embodiments, the vessel is a cylindrical pressure vessel with hemispheric end caps. The feed water stream 102 is introduced at the top of the vessel and flows down through the vessel through of filter media. The filer media is arranged to increase filtration, for example, capturing larger particles towards the top and smaller particles towards the bottom, as the water from the feed water stream 102 flows through the filtration system. For example, the filter media can include sand, anthracite, and garnet, among others. The filter media is selected on the basis of density and particle size for the filtration. As denser materials will settle out more quickly, the filter media will reform after backwashing.

The backwashing stream 124 is introduced into the MMF 104 through the bottom of the vessel. During backwashing, the filter media is lifted and fluidized, allowing separated solids to be washed from the filter media and into the backwash waste stream 126. The backwash waste stream 126 is removed from the top of the vessel and sent to the MMF backwash tank 128.

The MMF backwash tank 128 may be an atmospheric or a pressure vessel with a conical bottom surface that allows separated solids to settle. The MMF backwash tank 128 may include other devices to enhance the settling of separated solids, such as introducing the backwash waste stream 126 through a cyclonic separator, for example, mounted at the top of the MMF backwash tank 128. Periodically, the MMF backwash tank 128 is purged through the drain line 132 to dump the separated solids that build up in the cone. This may be performed manually, or automatically, for example, on a timed basis or using a level sensor to determine when the cone is nearly full.

As described with respect to FIG. 1, the filtered water from the MMF 104 is introduced into an ozone contactor 112. In some embodiments, the ozone contactor 112 is a pressure vessel, with a pressure maintained by the pressure regulator 154. Ozone gas is introduced into the contactor, for example, using a sparge ring located at the bottom of the ozone contactor 112. The ozone gas may be introduced through any number of other configurations. The ozone contactor 112 is sized to provide sufficient contact time with the ozone, for example, to disinfect the water and oxidize organic materials. In various embodiments, the ozone contactor 112 is sized to provide an average contact time of 1 minute (min.), 2 min., 5 min., or longer. The contact time may be determined by several ways such as the amount type of microorganisms, organic contaminants, wherein higher amounts indicate the selection of longer contact times.

The disinfected water flows through a dissolved ozone sensor 137. In various embodiments, the ozone sensor 137 is a commercially available control device that directly measures dissolved ozone in water. In some embodiments, an ORP sensor, that indirectly measures the dissolved ozone level in water, with an embedded microcontroller to control the ozone generator 134 through the control line 140. In some embodiments, the ozone sensor has a network communications device to allow the ozone sensor to communicate over a plant network with the ozone generator 134, a plant control system, such as a distributed control system (DCS), and the like. In some embodiments, the ozone sensor controls a valve 138 (or 144) in addition to controls sent to the ozone generator 134.

The ozone generator 134 may be a commercially available unit that is sized to provide the amount of ozone gas needed by the water purification process. For example, ozone generators are available from Absolute Ozone® of Edmonton, Alberta, Canada, and SUEZ Water Technologies and Solutions of Minnetonka, Minnesota, USA, among others.

The disinfected water from the contactor flows into the ceramic membrane filter 116. The current techniques are not limited to the use of ceramic membranes, but may be used with other filter systems that are prone to fouling, such as polymer membranes, among others. However, the exposure of a polymer membrane to ozone may decrease the lifespan of the filter unit. The ceramic membrane filter 116 may be an ultrafiltration membrane, a reverse osmosis membrane, and the like. In some embodiments, the ceramic membrane filter 116 is a ceramic cartridge used as a reverse osmosis filter, for example, used to produce potable water. In some embodiments, ceramic membrane filter 116 includes a number of ceramic cartridges to increase throughput. The waste water, or retentate, from the ceramic membrane filter 116, can be disposed of to the sewer system, injected into a waste well, or allowed to return to 128 where the solids are separated again.

As described herein, an air scouring stream 148 that includes ozone gas blended with an air stream is fed to the ceramic membrane filter 116 to destroy any film that forms on the units in the ceramic membrane filter 116. The air stream is provided from the air source 150. The air source 150 may be any source of pressurized air capable of flowing into the ceramic membrane filter 116. In various embodiments, the air source 150 is a stand-alone compressor, a plant air system, or air tanks, among others.

The purified water stream 118, or permeate, of the ceramic membrane filter 116 also has an ozone sensor 142, as described with respect to FIG. 1. As for the dissolved ozone sensor 137 placed between the ozone contactor 112 and the ceramic membrane filter 116, the dissolved ozone sensor 142 is an ORP sensor used to measure the ORP of the filtered water. The ORP sensor can include control electronics to control a valve 144 between the ozone generator 134 and the air scouring stream 148 through a control line 145. In some embodiments, the ORP sensor includes a network communications device to communicate with the valve 144, a plant control system, the ozone generator 134, or the dissolved ozone sensor 137, among others.

The filtered water is flowed into a tank 120 which is used as the source of water for the backwashing stream 124 and for storage of the water for downstream users, such as a desalination Reverse Osmosis plant. The tank 120 will generally be an atmospheric tank which is sized by the downstream demand over time. Generally, the tank 120 will be sized to provide purified water for peak demands while the water purification system 100 is running continuously or is off-line for servicing. In some embodiments, the tank 120 is 100 L in size, 200 L, 500 L, 1000 L, 5000 L, or larger.

Embodiments

An embodiment described in examples herein provides a system for purifying water. The system includes a multimedia filter, an ozone generator, an ozone contactor coupled to the ozone generator, and a ceramic membrane filter coupled to an air scouring system, wherein the air scouring system is coupled to the ozone generator. A storage tank is coupled to a purified water line from the ceramic membrane filter, wherein the storage tank is coupled to a backwashing line coupled to the multimedia filter.

In an aspect, the system includes a dissolved ozone sensor disposed on a disinfected water line from the ozone contactor, wherein the dissolved ozone sensor is coupled to a control line to the ozone generator. In an aspect, the dissolved ozone sensor comprises control electronics to control the dissolved ozone in the disinfected water line. In an aspect, the dissolved ozone sensor comprises a network communications device to communicate with a plant control system. In an aspect, the dissolved ozone sensor comprises an oxidation-reduction potential sensor.

In an aspect, the system includes a dissolved ozone sensor disposed on a purified water line from the ceramic membrane filter, wherein the dissolved ozone sensor is coupled to a valve on an ozone gas line from the ozone generator.

In an aspect, the air scouring system comprises an air source coupled to the ceramic membrane filter through an air line.

In an aspect, the ozone generator is coupled to the air line through an ozone gas line comprising an in-line valve to control addition of ozone gas.

In an aspect, the system includes a multimedia filter (MMF) backwash tank coupled to a backwash waste line from the multimedia filter. In an aspect, the MMF backwash tank has a conical bottom to allow separated solids to settle. In an aspect, the MMF backwash tank comprises a cyclonic separator. In an aspect, a clarified supernatant water line is coupled from the multimedia backwash tank to the purified water line from the ozone contactor.

Another embodiment described in examples herein provides a method for controlling biological fouling during purification of water. The method includes adding ozonated water to a feed water stream, filtering the feed water stream through a multimedia filter (MMF) forming a filtered water stream, and passing the filtered water stream through an ozone contactor forming a disinfected water stream. The method includes passing the disinfected water stream through a ceramic membrane filter forming a purified water stream, and providing an air scouring stream comprising ozone to the ceramic membrane filter.

In an aspect, the method includes measuring a value for a dissolved ozone concentration in the disinfected water stream, and controlling an ozone generator to control the value of the dissolved ozone concentration. In an aspect, the method includes controlling the value of the dissolved ozone concentration between about 0.15 ppm and 0.20 ppm.

In an aspect, the method includes measuring a value of a dissolved ozone concentration in the purified water stream, and controlling a valve on an ozone gas line to the air scouring stream to control the value of the dissolved ozone concentration.

In an aspect, the method includes storing the purified water stream in a tank. In an aspect, the method includes providing a backwashing stream from the tank to the multimedia filter.

In an aspect, the method includes flowing a backwash waste stream into a conical tank, allowing separated solids in the backwash waste stream to at least partially settle to a bottom surface of the conical tank forming clarified supernatant water. The clarified supernatant water is added to the disinfected water upstream of the ceramic membrane filter.

Other implementations are also within the scope of the following claims.

What is claimed is:
1. A system for purifying water, comprising:
   a pretreatment system comprising:
      a feed water line;
      a multimedia filter (MMF) receiving the feed water line;
      an ozone generator;
      an ozone contactor coupled to the ozone generator;
      a filtered water line extending from the MMF to the ozone contactor;
      a ceramic membrane filter coupled to an air scouring system, wherein the air scouring system is coupled to the ozone generator;
      a disinfected water line extending from the ozone contactor to the ceramic membrane filter;
      a sideline extending from the disinfected water line to the feed water line;

a storage tank coupled to a purified water line from the ceramic membrane filter, wherein the storage tank is coupled to a backwashing line coupled to the multimedia filter; and a reverse osmosis system downstream of the pretreatment system.

2. The system of claim 1, comprising a dissolved ozone sensor disposed on the disinfected water line from the ozone contactor, wherein the dissolved ozone sensor is coupled to a control line to the ozone generator.

3. The system of claim 2, wherein the dissolved ozone sensor comprises control electronics to control the dissolved ozone level in the disinfected water line.

4. The system of claim 2, wherein the dissolved ozone sensor comprises a network communications device to communicate with a plant control system.

5. The system of claim 2, wherein the dissolved ozone sensor comprises an oxidation-reduction potential sensor.

6. The system of claim 1, comprising a dissolved ozone sensor disposed on the purified water line from the ceramic membrane filter, wherein the dissolved ozone sensor is coupled to a valve on an ozone gas line from the ozone generator.

7. The system of claim 1, wherein the air scouring system comprises an air source coupled to the ceramic membrane filter through an air line.

8. The system of claim 7, wherein the ozone generator is coupled to the air line through an ozone gas line comprising an in-line valve to control addition of ozone gas.

9. The system of claim 1, comprising a MMF backwash tank coupled to a backwash waste line from the multimedia filter.

10. The system of claim 9, wherein the MMF backwash tank has a conical bottom to allow separated solids to settle.

11. The system of claim 9, wherein the MMF backwash tank comprises a cyclonic separator.

12. The system of claim 9, wherein a clarified supernatant water line is coupled from the MMF backwash tank to a disinfected water stream from the ozone contactor.

* * * * *